US011379808B2

(12) United States Patent
Eriksson et al.

(10) Patent No.: US 11,379,808 B2
(45) Date of Patent: Jul. 5, 2022

(54) SYSTEM AND METHOD FOR USE OF PREPARE-PROCEED WORKFLOW TO ORCHESTRATE OPERATIONS ASSOCIATED WITH A MEDIA CONTENT ENVIRONMENT

(71) Applicant: SPOTIFY AB, Stockholm (SE)

(72) Inventors: Thomas André Eriksson, Stockholm (SE); Stefan Tom Ekerfelt, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 16/169,869

(22) Filed: Oct. 24, 2018

(65) Prior Publication Data

US 2019/0122192 A1 Apr. 25, 2019

Related U.S. Application Data

(60) Provisional application No. 62/576,527, filed on Oct. 24, 2017.

(51) Int. Cl.
*G06Q 20/12* (2012.01)
*G06Q 20/10* (2012.01)
(Continued)

(52) U.S. Cl.
CPC ......... *G06Q 20/123* (2013.01); *G06Q 20/047* (2020.05); *G06Q 20/102* (2013.01); *G06Q 20/1235* (2013.01); *G06Q 20/145* (2013.01)

(58) Field of Classification Search
CPC .... G06Q 20/40; G06Q 20/3278; G06Q 20/12; G06Q 20/20; G06Q 20/367; G06Q 20/36;
(Continued)

(56) References Cited

U.S. PATENT DOCUMENTS

2005/0027871 A1\* 2/2005 Bradley ................. H04L 63/10
709/227
2007/0162456 A1\* 7/2007 Agassi ................... G06Q 10/10
(Continued)

OTHER PUBLICATIONS

Jurcut, Horia; "Spotify Payments—How we create API's to manage complexity"; The 2016 Platform Summit, Oct. 24-26, 2016; 57 pages.

(Continued)

*Primary Examiner* — Alexander G Kalinowski
*Assistant Examiner* — Sanjeev Malhotra
(74) *Attorney, Agent, or Firm* — Tucker Ellis LLP

(57) ABSTRACT

In accordance with an embodiment, described herein is a system and method for orchestration of operations associated with a media content environment, including use of a prepare-proceed workflow process (workflow) that supports definition and use of different payment/billing systems or processes. A payment/billing server, for use with the media content environment dynamically generates workflows for use in processing payments associated with products. Upon receipt of a request to purchase a product, the payment/billing server generates a workflow to process a payment, including querying a product subsystem to determine pre-authorization steps required for purchase of the product and executing the pre-authorization steps; querying a transaction subsystem to determine a transaction information required for authorization; and querying a payment processor for authorization of the transaction. The payment/billing server then executes any required post-authorization steps, and communicates with the payment processor to capture the purchase.

17 Claims, 10 Drawing Sheets

(51) Int. Cl.
*G06Q 20/14* (2012.01)
*G06Q 20/04* (2012.01)

(58) Field of Classification Search
CPC ............ G06Q 20/401; G06Q 20/4014; G06Q 20/4016; G06Q 20/405; G06Q 10/0633; G06Q 10/067; G06Q 20/02; G06Q 20/023; G06Q 20/10; G06Q 20/202; G06Q 20/322; G06Q 20/3223; G06Q 20/3674; G06Q 20/3821; G06Q 20/385; G06Q 20/387; G06Q 2220/00; G06Q 40/02; G06Q 50/34; Y04S 10/54; H04L 63/08; H04L 63/102; H04L 63/0281; H04L 63/0428; H04L 3/10; H04L 63/105; H04L 63/20; G06F 21/10; G06F 21/6218; G07F 17/3223; G07F 17/3237; G07F 17/329
USPC ......... 705/7.31, 21, 26.5, 41, 44, 317, 36 R, 705/333; 700/95; 726/3; 709/227; 719/313

See application file for complete search history.

(56) References Cited

U.S. PATENT DOCUMENTS

| | | | | |
|---|---|---|---|---|
| 2009/0327153 A1* | 12/2009 | Milne | ................ | G06Q 40/04 705/36 R |
| 2010/0235301 A1* | 9/2010 | Tanpoco | ................ | G06Q 40/00 705/36 R |
| 2011/0066562 A1* | 3/2011 | Stapleton | ............... | G06Q 10/00 705/317 |
| 2011/0307348 A1* | 12/2011 | Vasing | ................ | G06Q 20/40 705/26.5 |
| 2013/0031566 A1* | 1/2013 | Sureshan | ........... | G06Q 10/0633 719/313 |
| 2013/0184844 A1* | 7/2013 | Dinicola | ................ | G06Q 30/02 700/95 |
| 2014/0089120 A1* | 3/2014 | Desai | .................... | G06Q 30/06 705/21 |
| 2014/0214678 A1* | 7/2014 | Williams | ............. | G06Q 20/401 705/44 |
| 2014/0250011 A1* | 9/2014 | Weber | ................ | G06Q 20/4016 705/44 |
| 2015/0006427 A1* | 1/2015 | Notani | ................. | G06Q 10/087 705/333 |
| 2015/0058931 A1* | 2/2015 | Miu | ...................... | G06Q 20/02 726/3 |
| 2015/0142514 A1* | 5/2015 | Tutte | .................. | G06Q 30/0269 705/7.31 |
| 2016/0125394 A1* | 5/2016 | Desai | .................... | G06Q 20/32 705/41 |
| 2016/0210626 A1* | 7/2016 | Ortiz | .................... | G06Q 20/023 |
| 2017/0004422 A1* | 1/2017 | Todd | ...................... | G06Q 20/20 |
| 2017/0006010 A1* | 1/2017 | Miu | ....................... | G06F 21/577 |
| 2017/0116403 A1* | 4/2017 | Bouse | ................ | G06F 16/2228 |
| 2017/0148021 A1* | 5/2017 | Goldstein | ........... | H04L 63/0281 |
| 2017/0221055 A1* | 8/2017 | Carlsson | ................ | H04L 63/10 |
| 2017/0249622 A1* | 8/2017 | Ortiz | .................... | G06Q 20/387 |
| 2017/0250005 A1* | 8/2017 | Ovalle | ................ | G07F 17/3204 |
| 2017/0323703 A1* | 11/2017 | Ovalle | ................ | G07F 17/3237 |
| 2018/0293573 A1* | 10/2018 | Ortiz | ..................... | G06Q 20/20 |

OTHER PUBLICATIONS

Nordic API's; "The 2016 Platform Summit, Oct. 24-26, 2016, Globen, Stockholm—Schedule Conference Day Oct. 1-25"; 10 pages.

Doerrfeld, Bill; "The Brilliance of Spotify Internal APIs to Mitigate Payments", Nov. 8, 2016, updated Apr. 3, 2017; retrieved from <https://nordicapis.com/the-brilliance-of-spotify-internal-apis-to-mitigate-payments/> on Oct. 23, 2017; 10 pages.

* cited by examiner

SYSTEM AND METHOD FOR USE OF PREPARE-PROCEED WORKFLOW TO ORCHESTRATE OPERATIONS ASSOCIATED WITH A MEDIA CONTENT ENVIRONMENT

CLAIM OF PRIORITY

This application claims the benefit of priority to U.S. Provisional Patent Application titled "SYSTEM AND METHOD FOR PROVIDING A PAYMENT/BILLING SYSTEM AND APIS", Application No. 62/576,527 filed Oct. 24, 2017; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments described herein are generally related to systems and methods for orchestration of operations associated with a media content environment, including use of a prepare-proceed workflow that enables use of different payment processes.

BACKGROUND

Media content environments, for example streaming media service/providers such as Spotify, enable users to stream music, video, or other media content, using a variety of devices, and in a manner that complements their lifestyle, while commuting, exercising, relaxing at home, or engaging in other types of activities.

Some streaming media service/providers allow users to access their media content through a "freemium" service model that provides free access to basic features, in return for receiving advertisements inserted into media streams, with more advanced features offered at additional cost.

With such a model, users can elect to switch to one or more paid subscription plans that provide advertisement-free media content streaming, or include premium features such as higher-quality data streams, offline-access, or access to select content. Streaming media service/providers may also offer the ability to purchase items via the service provider, such as concert tickets or other merchandise.

Generally, in order to process subscription payments made by users, either the service provider, or a third-party payment processor, must verify that the user is authorized to pay using a selected payment type; while at the same time complying with any requirements of the state or country in which the payment originates and/or user resides.

However, when streaming media service/providers offer additional products, rates, payment types, and/or expand their services to additional geographical regions, workflows must be developed to comply with the various requirements of those regions. The need to develop customized payment processing workflows inhibits the flexibility to accommodate new regions and payment/billing systems or processes.

SUMMARY

In accordance with an embodiment, described herein is a system and method for orchestration of operations associated with a media content environment, including use of a prepare-proceed workflow process (workflow) that supports definition and use of different payment/billing systems or processes. A payment/billing server, for use with the media content environment dynamically generates workflows for use in processing payments associated with products. Upon receipt of a request to purchase a product, the payment/billing server generates a workflow to process a payment, including querying a product subsystem to determine pre-authorization steps required for purchase of the product and executing the pre-authorization steps; querying a transaction subsystem to determine a transaction information required for authorization; and querying a payment processor for authorization of the transaction. The payment/billing server then executes any required post-authorization steps, and communicates with the payment processor to capture the purchase.

In accordance with an embodiment, a technical purpose of the described systems and methods includes a means of processing data associated with payments for products in a digital media content environment, through the use of a payment/billing server that coordinates workflows involving various subsystems, each of which can contribute their own data or workflow requirements. A workflow process can operate upon an internal order state data, which controls the operation of user interfaces that in turn enable the input of payment information. Instead of requiring custom software coding to support each new product, payment type, or form of authorization, the system enables automatic generation and processing of workflows, based on product information and transaction information that can be separately generated, stored, and accessed by the system upon request.

Other objectives, features and advantages of the described embodiments will be apparent from the following detailed disclosure, claims, and drawings.

DETAILED DESCRIPTION

As described above, media content environments, for example streaming media service/providers such as Spotify, enable users to stream music, video, or other media content, using a variety of devices, and in a manner that complements their lifestyle, while commuting, exercising, relaxing at home, or engaging in other types of activities.

Streaming Media Content Environments

Figure 1:
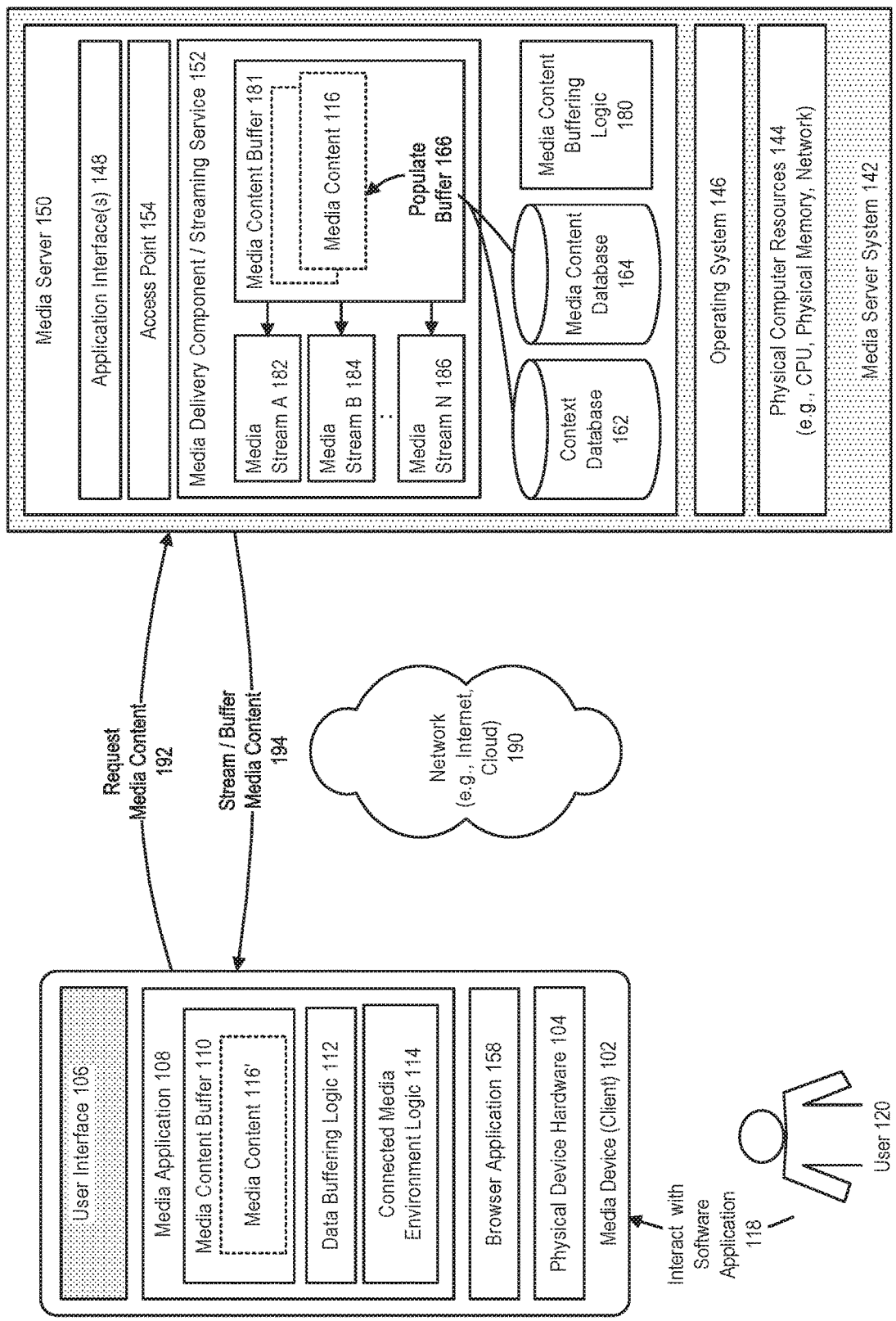
FIG. 1 illustrates an example of a system for providing media content, in accordance with an embodiment.

FIG. 1 illustrates an example of a system for providing media content, in accordance with an embodiment.

As illustrated in FIG. 1, in accordance with an embodiment, a media device 102, operating as a client device, can receive and play media content provided by a media server system 142 (media server), or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, each of which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 114, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system 146 or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, such as from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate 166 a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 120 can interact 118 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 192 to the media server, via the server's application interface. The media server can populate its server-side media content buffer at the server, with corresponding media content 116, including one or more streams of media content data, and can then communicate 194 the selected media content to the user's media device, or to a controlled device as appropriate, where it can be buffered in a client-side media content buffer for playing at the device.

In accordance with an embodiment, and as further described below, the system can include a server-side media gateway or access point 154, provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "access-point", which forwards client requests to other servers, such as sending one or more metadataproxy requests to one of several metadataproxy machines, on behalf of the client or end user.

Figure 2:
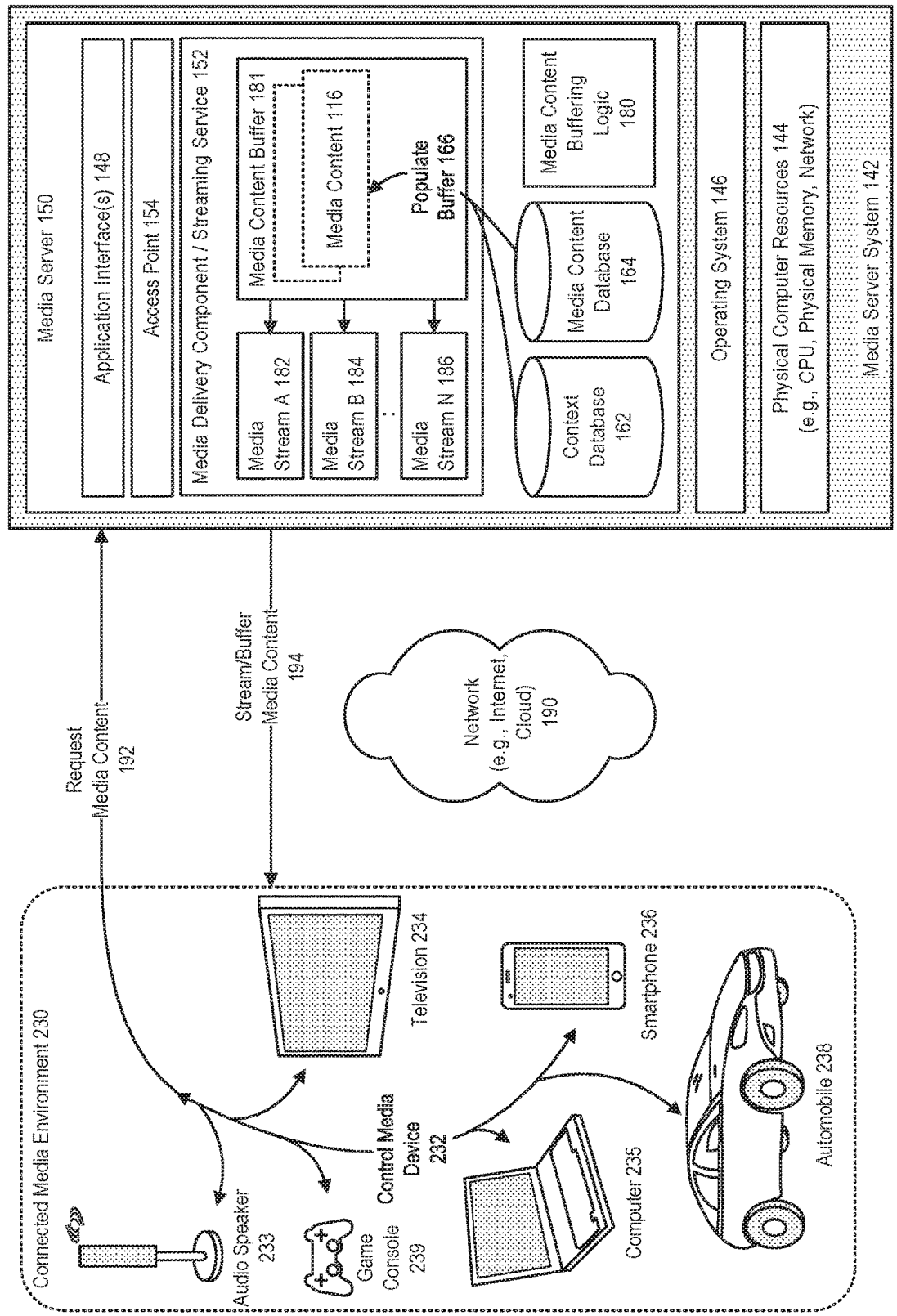
FIG. 2 further illustrates an example of a system for providing media content, in accordance with an embodiment.

In accordance with an embodiment, the media device can also include a browser application 158 that can be used in combination with the media device and/or media application to access various features of the media server or other systems FIG. 2 further illustrates an example of a system for providing media content, in accordance with an embodiment.

As illustrated in FIG. 2, in accordance with an embodiment, a connected media environment 230, for example a Spotify Connect environment, enables communication between a client device and the server-side access point in a connected manner from the perspective of a user. Examples of the types of media device that can be provided within a connected media environment include audio speakers 233, televisions 234, computers 235, smartphones 236, and in-car entertainment systems 238, game consoles 239, or other types of media device.

In accordance with an embodiment, a client device having an application user interface can act as a controlling client device, to control the playback of media content at a controlled device. In accordance with an embodiment, a client device can itself act as a media gateway or access point, for use by other devices within the system for providing media content.

In accordance with an embodiment, a controlled device can also include a media application, which in the case of an audio speaker, television or similar device can be included within the device itself as firmware logic, or within, for example, a separate set-top box or similar after-market device.

As described above, in accordance with an embodiment, a user can interact with the user interface at a client device, and issue requests to access media content, for example the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request to change a media channel, in response to which the media server can switch the media channel at the controlled device, and thereafter continue to stream or buffer media content for the switched channel, at the controlled device.

As described above, in some instances, a portion of the media content can be pre-buffered at the controlled device, so that the switching to the channel at the controlled device operates in a seamless manner.

Product Offerings by Streaming Media Service/Providers

As described above, some streaming media service/providers allow users to access their media content through a "freemium" service model that provides free access to basic features, in return for receiving advertisements inserted into media streams, with more advanced features offered at additional cost.

With such a model, users can elect to switch to one or more paid subscription plans that provide advertisement-free media content streaming, or include premium features such as higher-quality data streams, offline-access, or access to select content. Streaming media service/providers may also offer the ability to purchase items via the service provider, such as concert tickets or other merchandise.

Figure 4:
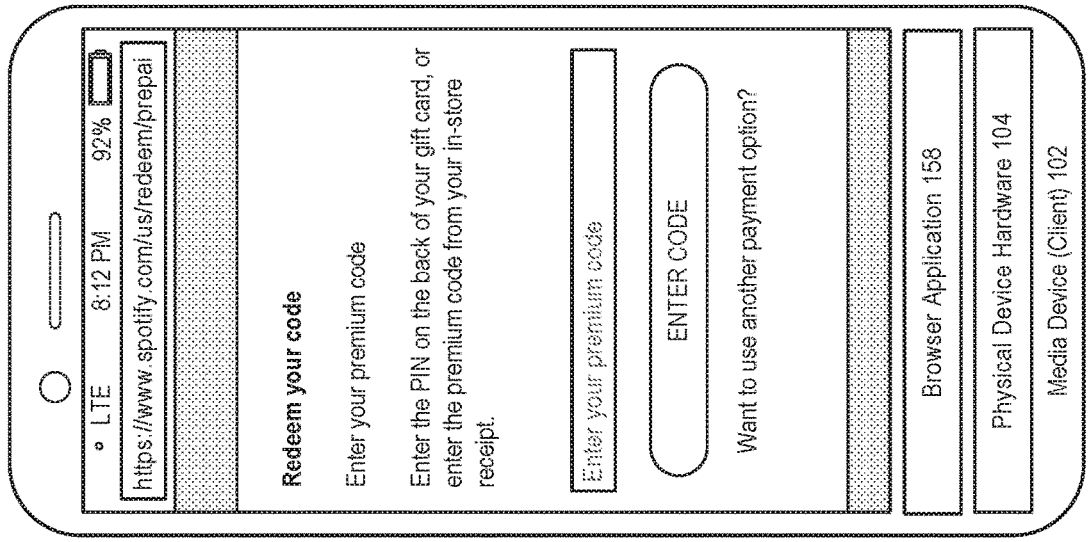
FIG. 4 further illustrates an example usage of a media device to participate in a transaction, in accordance with an embodiment.
Figure 3:
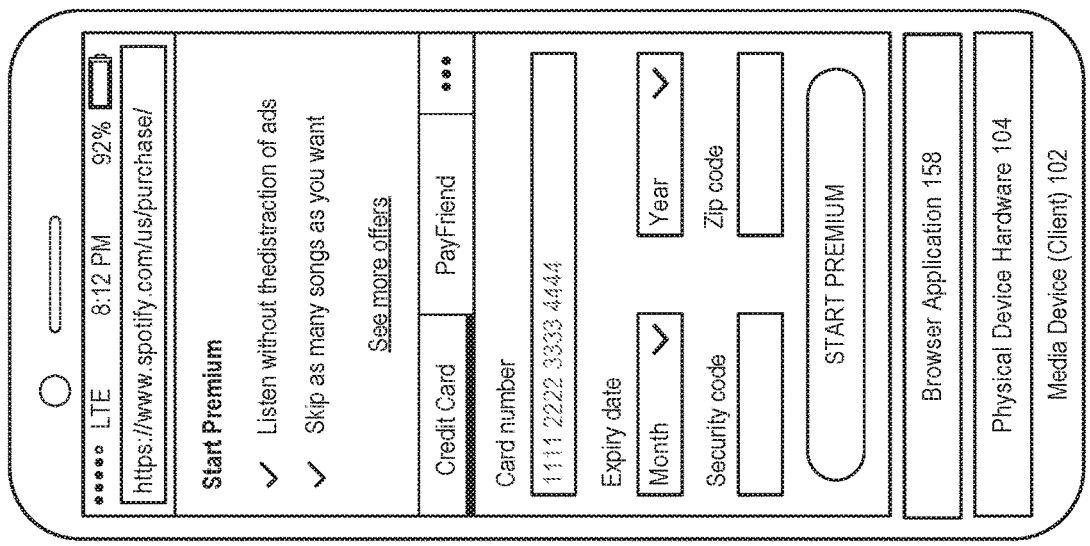
FIG. 3 illustrates an example usage of a media device to participate in a transaction, in accordance with an embodiment.

FIG. 3 and FIG. 4 illustrate an example usage of a media device to participate in a transaction, in accordance with an embodiment.

As illustrated in FIG. 3, in accordance with an embodiment, a user can interact with a media device, via the user interface, to purchase products, for example subscription products, associated with a streaming media service/provider. In this example, the user interface displays a web page associated with a service provider's web site (e.g., Spotify.com), and allows a user to purchase a subscription product for use with an account registered or otherwise associated with the streaming media service/provider. The service provider may require the user to login prior to purchasing a product, in order to match the client accessing the web site with a user or account name, or confirm the user's current subscription information or user profile, which can include information such as state and country of residence and billing address.

In accordance with an embodiment, once the user has selected a product to purchase, a workflow is initiated. For example, the user can be taken to a checkout page where the user can selected a payment method, enter a required payment information, and confirm the purchase. Alternatively, the workflow may present additional screens to the user to receive inputs prior to taking the user to the checkout page. Once payment information is entered and purchase is confirmed, the workflow can proceed with processing.

As illustrated in FIG. 4, in accordance with an embodiment, in addition to purchasing a product via a payment method from a third-party payment processor, a service provider may also allow a user to redeem codes, for example from a gift card, a pre-paid subscription card, or an in-store receipt.

Processing of Payments Associated with Product Purchases

Purchases associated with the products offered by streaming media service/providers may be processed using workflows designed by a process designer for each product offering. Since different markets may have different information requirements for processing purchases, a product may be associated with a workflow for each market where that product is to be offered. The purchase of certain products may require additional steps to be performed and, depending on the outcome of one step, steps may be added or modified depending on a received user input. Workflows associated with product purchases may also be modified for each payment type available to a purchaser.

Figure 5:
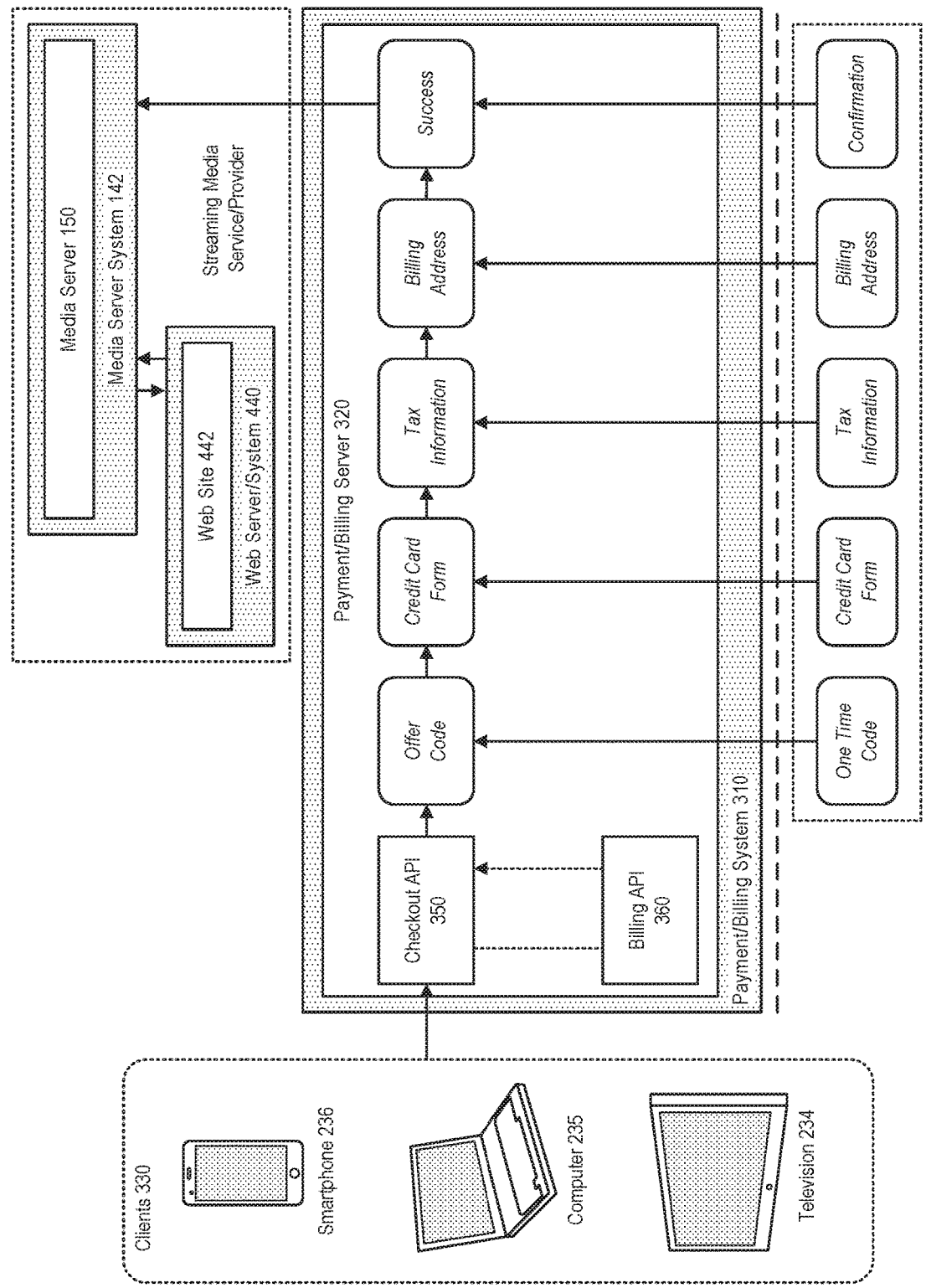
FIG. 5 illustrates a payment/billing system, as may be used to process payments, in accordance with an embodiment.

FIG. 5 illustrates a payment/billing system, as may be used to process payments, in accordance with an embodiment.

As illustrated in FIG. 5, in accordance with an embodiment, the processing of payments associated with product purchases generally involves an interaction of a client with a payment backend, e.g., a payment/billing system 310 operating a payment/billing server 320, which can be provided as software or program code that is executable by a computer system or other processing device. For example, clients 330 can provide a web browser that interacts with a service provider's website (e.g., Spotify.com) 442 at a web server system 440, which communicates with the payment/billing server.

When relatively few products are offered within relatively few markets, using a relatively small number of payment types, the payment/billing system can operate with a correspondingly small number of workflows. However, as any of these three factors (products/markets/payment types) increases, the number of required workflows also increases. This can limit a company's ability to increase its product offering, expand into new markets, or support new payment types.

In accordance with an embodiment, the payment/billing system can provide a number of application program interfaces (APIs), including a checkout API 350 and a billing API 360, that together process payments between clients and payment processors (sometimes referred to as "payment service providers") having their own particular API requirements.

In accordance with an embodiment, the checkout API describes how to implement a payment experience. For example, the checkout API can attempt to validate payment details and being the authorization process, including gathering information, and facilitating back-and-forth communication between the payment backend and the clients.

For example, in some countries, users may be required to fill in additional tax information, and the payment backend may need to inform clients of this additional step. The clients are then responsible for collecting the required information, for example through the use of a tax information form that can be displayed at the client to collect that information.

Figure 6:
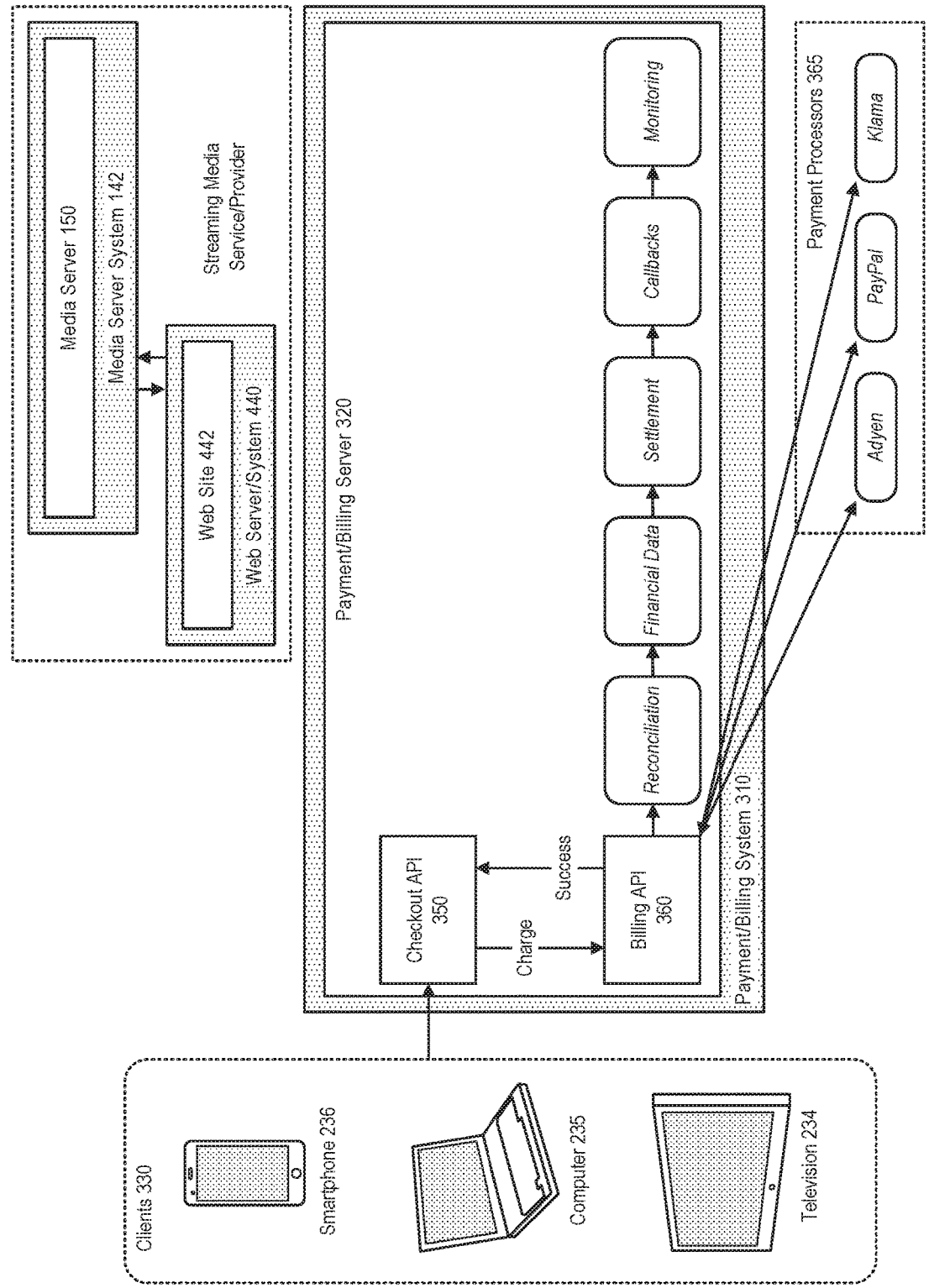
FIG. 6 further illustrates a payment/billing system, as may be used to process payments, in accordance with an embodiment.

FIG. 6 further illustrates a payment/billing system, as may be used to process payments, in accordance with an embodiment.

As illustrated in FIG. 6, in accordance with an embodiment, the billing API abstracts the details of one or more payment processors 365, effectively hiding the details from the payment backend into a call which asks: "can I charge the user X amount of money?" and receives a response of "yes or no". The billing API is also responsible for producing financial data for handling settlement and reconciliation for callbacks from payment processor, monitoring, and providing alerts when anomalies are detected during a transaction.

Orchestration of Payments with Prepare-Proceed Workflows

In accordance with an embodiment, the system enables orchestration of operations associated with a media content environment, including use of a prepare-proceed workflow process (workflow) that supports definition and use of different payment/billing systems or processes. A payment/billing server, for use with the media content environment dynamically generates workflows for use in processing payments associated with products. Upon receipt of a request to purchase a product, the payment/billing server generates a workflow to process a payment, including querying a product subsystem to determine pre-authorization steps required for purchase of the product and executing the pre-authorization steps; querying a transaction subsystem to determine a transaction information required for authorization; and querying a payment processor for authorization of the transaction. The payment/billing server then executes any required post-authorization steps, and communicates with the payment processor to capture the purchase.

Figure 7:
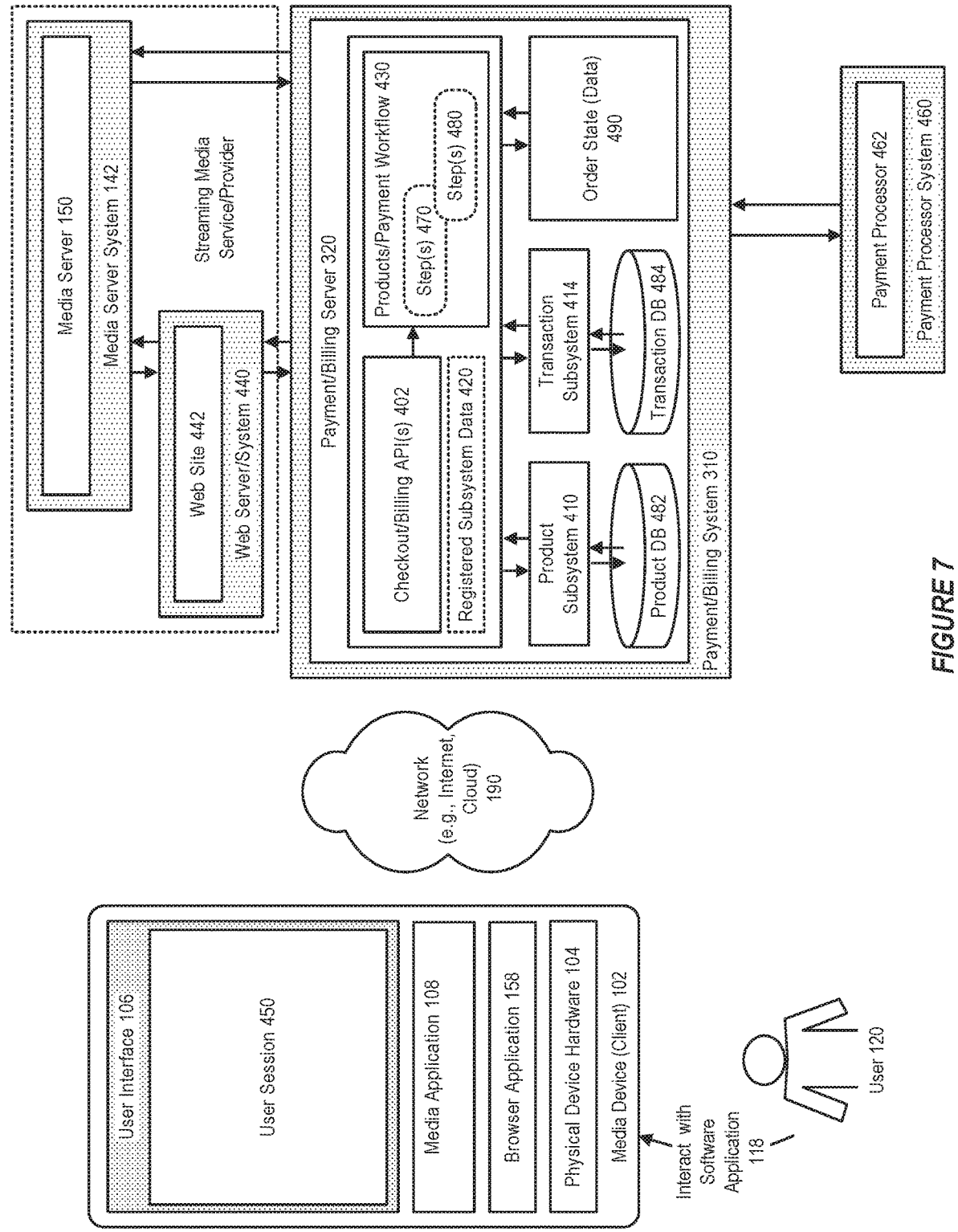
FIG. 7 illustrates a system that supports a prepare-proceed workflow, for processing or payments, in accordance with an embodiment.

FIG. 7 illustrates a system that supports a prepare-proceed workflow, for processing or payments, in accordance with an embodiment.

As illustrated in FIG. 7, the payment/billing server can integrate a product subsystem 410 that provides data associated with products, and a transaction subsystem 414 that provides data associated with transaction processing, for use in creating, adapting or modifying the workflow required to process a particular transaction, each of which can be provided as software or program code that is executable by a computer system or other processing device.

In accordance with an embodiment, the product subsystem and the transaction subsystem can be associated with, and access, respective databases 482, 484, to store or retrieve data. The payment billing server can provide one or more checkout/billing APIs 402, for example, a checkout API and billing API as described above, and maintain data describing registered subsystems 420, each of which can similarly be provided as software or program code executable by a computer system or other processing device.

In accordance with an embodiment, a workflow 430 for processing a payment associated with a particular transaction, to purchase a product, can be initiated when a user requests the product, for example via a browser application on their client media device. As described above, in some workflows, the user may also be prompted for information via a request for completion of various forms.

In accordance with an embodiment, the payment/billing server orchestrates the workflow, including one or more steps 470, 480, required for processing payments for products, as determined by registered subsystems. For example, the transaction subsystem can indicate transaction-related steps to be inserted into the workflow, while the product subsystem can indicate product-related steps to be inserted into the workflow.

In accordance with an embodiment, the payment/billing server maintains an order state (data) 490, to take into account information such as the combinatorial possibilities of products, payment types, and a user's state and country information, for use in creating, adapting or modifying the workflow.

Figure 8:
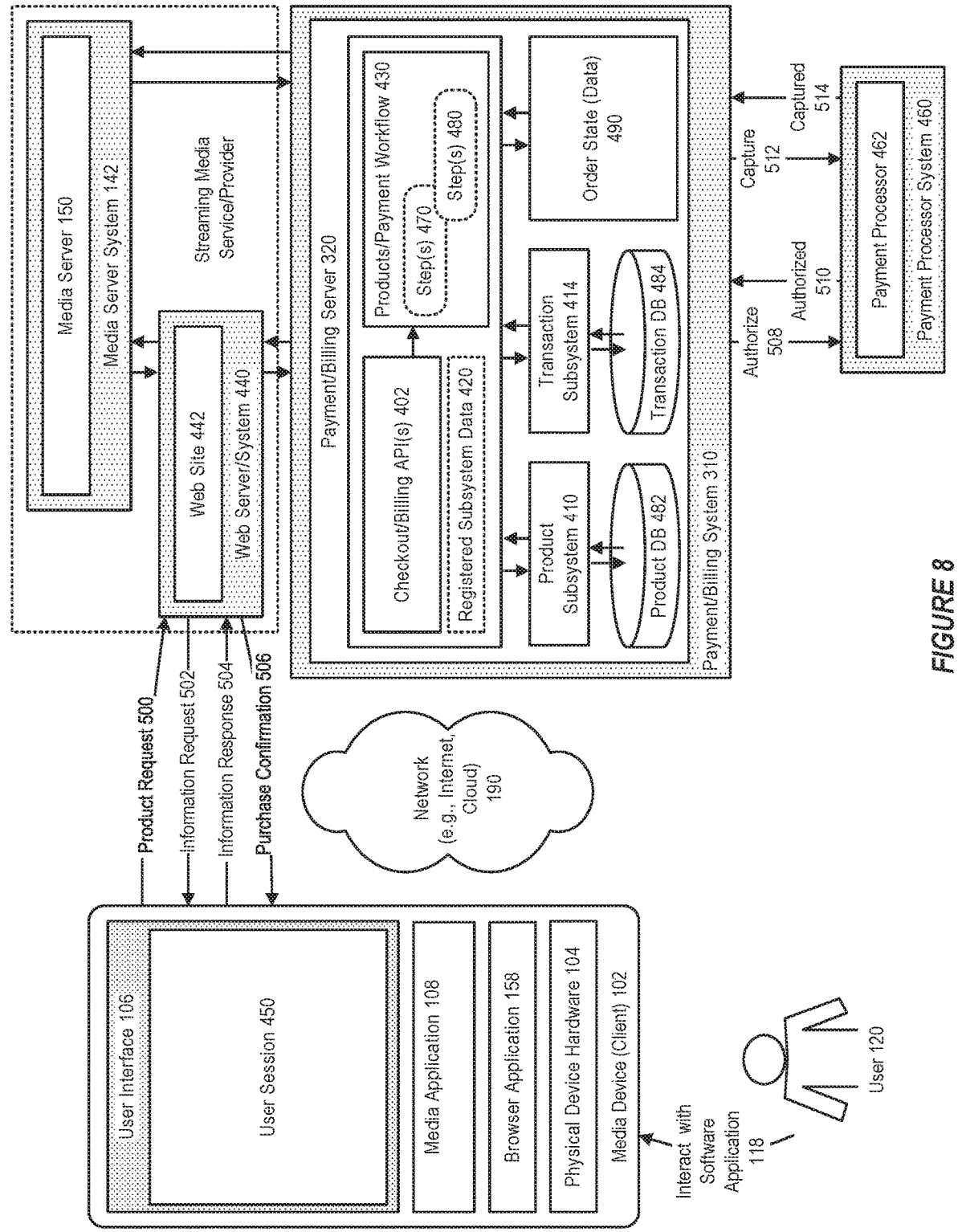
FIG. 8 further illustrates a system that supports a prepare-proceed workflow, for processing or payments, in accordance with an embodiment.

FIG. 8 further illustrates a system that supports a prepare-proceed workflow, for processing or payments, in accordance with an embodiment.

In accordance with an embodiment, product-related steps requested by a product subsystem can be modified based on the product requested by the user.

For example, a request by the user to purchase a "Premium for Students" product, may result in one or more specific product-related steps to be included in a workflow for the purchase of "Premium for Students". The step is then placed in the workflow as determined by the payment/billing server and upon reaching the step in the workflow, the web site for the service provider presents the user with a student verification form and requires the user to complete and submit the form.

In accordance with an embodiment, transaction-related steps requested by a transaction subsystem can be modified based on the payment type selected or requested by the user.

For example, a transaction-related step for a request by the user to make a purchase using a credit card may result in one or more specific transaction-related steps and requests for collection of payment information to be included in a workflow for the purchase of a product by the user (500, 502 504, 506). The step is then placed in the workflow as determined by the payment/billing server and upon reaching the step in the workflow, the web site for the service provider presents the user with a form for entering payment information.

In accordance with an embodiment, on the payment processing and transaction processing side, the workflow can utilize two separate transaction-related steps: a step to perform authorization and a step to perform capture. Authorization (508, 510) is the process of making a call from the payment/billing server (or the transaction subsystem) to a payment processor 462, operating at a payment processor system 460, to verify that payment information is valid and that the monies requested for the product can be charged. Capture (512, 514) confirms with the payment processor that the service provider wants to capture the monies and complete the transaction.

In accordance with an embodiment, on the product side, the workflow can operate with the product subsystem to instruct the payment/billing server to inject product-related steps either before or after the transaction step to perform authorization. Such steps can be defined as pre-authorization and post-authorization steps In accordance with an embodiment, when a workflow is initiated, the payment/billing server first queries the product subsystem and asks if there are any pre-authorization product-related steps that the particular product requested by the user requires to be performed prior to advancing to a transaction-related step. If these pre-authorization product-related steps are returned to the payment/billing server, the payment/billing server inserts the product-related steps into the workflow before the transaction-related steps.

Following the above example, if a user requests to purchase the "Premium for Students" product, then the product subsystem, when queried by the payment/billing server, can request that the payment/billing server insert, prior to proceeding to a transaction-related step, a product-related step to verify that the user is a student. This product-related step may require, for example, that a verification form or other technique for verification, such as a request for a photo of a student ID, be sent to the user, and a valid response be received from the user, prior to proceeding through the workflow.

In accordance with an embodiment, by determining when a step is appropriately positioned in the workflow, the payment/billing server can flexibly alter the workflow so that, for example, the user is not prompted to unnecessarily provide data that ultimately is not used to complete the transaction. For example, if a user requesting to purchase "Premium for Students" is prompted to input financial information such as credit card information, and is subsequently requested to provide student verification information which the user cannot provide, the credit card information input is no longer usable, as the user does not qualify to purchase the product.

In accordance with an embodiment, after the transaction-related step to perform authorization is complete, the payment/billing server can query the product subsystem and ask if there are any post-authorization product-related steps to insert into the workflow, as a result of the authorization completion. If so, then the product subsystem has the opportunity to insert more steps; otherwise the payment/billing server can move to the transaction-related step of capture.

In accordance with an embodiment, the flexibility of separating the product subsystem from the checkout system can, for example, allow a product manager to modify a product offering to improve the user experience, without redesigning an entire workflow of a product and each of its localized versions. For example, if a product manager determines that a user may prefer to view and select from available concert seats, prior to entering payment information, to ensure that a desired seat is available, that product can be modified so that the seating selection step is made a pre-authorization step, rather than a post-authorization step.

In accordance with an embodiment, the payment/billing server can also take into account and accommodate different regions and markets with different rules for both the content of the products, the permitted payment types, and the payment information requirements for processing a transaction. For example, the rules for the payment information required of the user can vary between countries, or between states or territories within a country.

In accordance with an embodiment, the product subsystem can maintain the requirements for processing in different regions, and can take into account the location of the user upon receiving a query from the payment/billing server, and can respond based on that location, for example by requesting different pre-authorization and post-authorization steps based on the location; or by requesting additional and/or different account information for the user, or denying an authorization request where appropriate; or other appropriate action.

Figure 9:
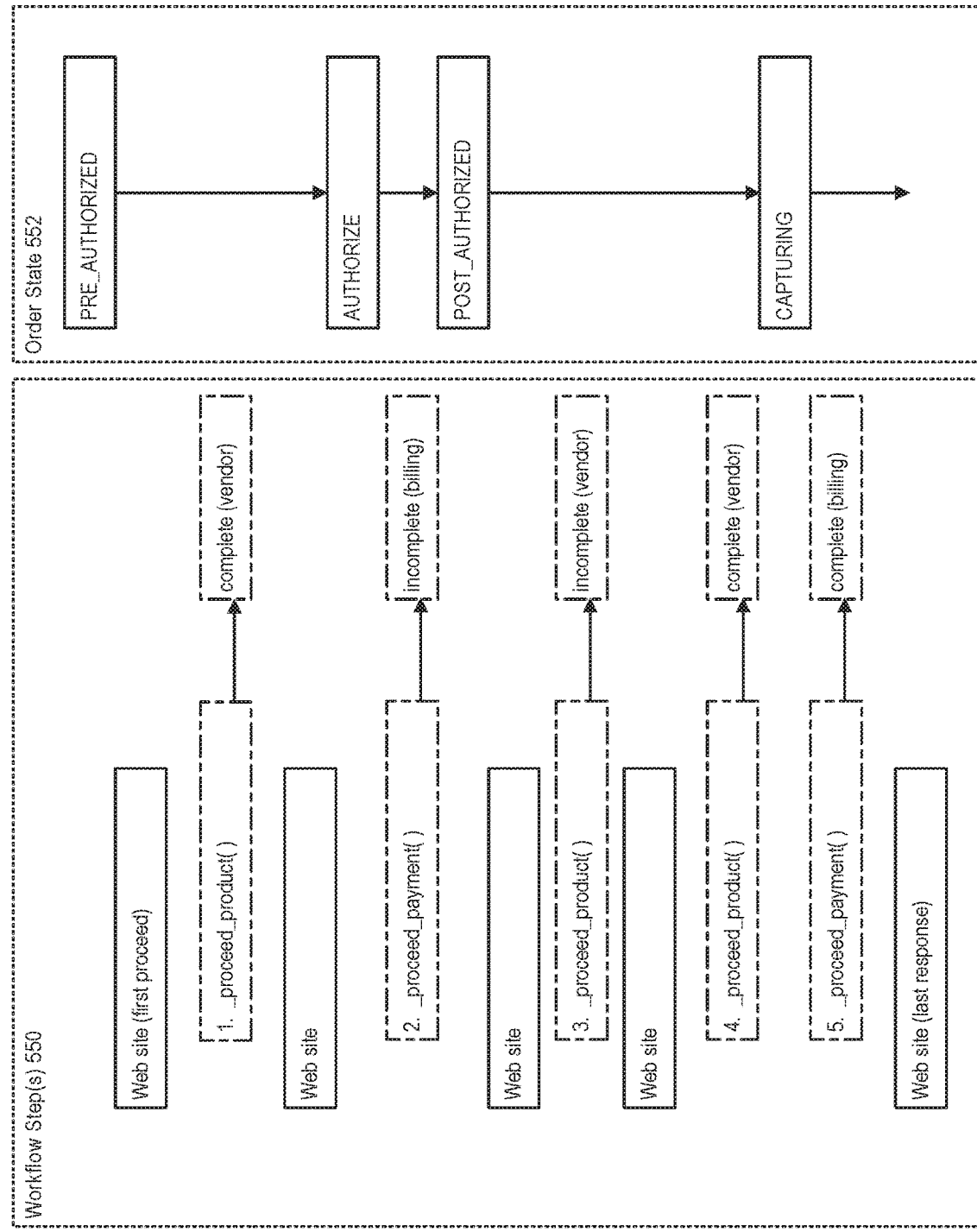
FIG. 9 illustrates an example illustration of changes to order state data during processing of a payment for a product, in accordance with an example embodiment.

FIG. 9 illustrates an example illustration of changes to order state data during processing of a payment for a product, in accordance with an example embodiment.

As illustrated in FIG. 9, in this example embodiment, workflow step(s) 550 cause or otherwise determine corresponding changes in order state 552. For example, a client can access a web site via a browser application to purchase a product. The workflow can include a do_proceed (self, tx, order, vendor, offer_entry, billing_data) remote procedure call, that drives the purchase process through the prepare-proceed flow, alternating, in this example, between vendor (proceed_product) and billing (proceed_payment) steps.

In accordance with an embodiment, the proceed_product( ) and proceed_payment( ) return types can dictate if more steps are needed, in which case an indication (e.g., Proceed-Info) can be returned to the web site. If no more steps are needed, then the workflow advances to the next order state.

In accordance with an embodiment, the workflow can include an auth_payment (self, tx, order, billing_data, initial_payment, merchant_ref) remote procedure call, that supports, in this example, both a normal authorization/capture flow and an authorization/3ds/capture flow.

In accordance with an embodiment, a new purchase order can be put into an AUTHORIZE state. Then, when an authorize call to the payment processor is made, the service provider can return a payload which instructs the payment/billing server to proceed with a 3D Secure (3DS) flow. Since, in this example, the authorization call from the payment/billing server is the same as without 3DS, the workflow can proceed to handle_auth_payment. The response is inspected, and the order is moved into an AUTH_3DS state if needed.

In accordance with an embodiment, if there is a 3DS response to the authorize call, the payment/billing server can instruct the web site to proceed with redirecting the client using, in this example, an AdyenCards3DSRedirectProceedInfo. Parameters such as MD and PaReq parameters can be passed to an acquirer. Once the client is back, the web site can call another proceed, but now with the order in the AUTH_3DS state, so the payment/billing server will expect AdyenCards3DSRedirectProceedBillingData with some specific data that can be used to finalize the authorization process with, in this example, an authorise3d call to Adyen.

In accordance with an embodiment, compliance with 3DS is made easier by a software component residing on the payment/billing server that can identify when it is necessary and inject itself into the workflow. For example, in the case of non-3DS flow, the AdyenCards3DSRedirectProceedInfo flow can be skipped and the payment/billing server return success (or failure) on the first proceed.

The above example embodiment is provided for purposes of illustration. In accordance with other embodiments and examples, other types of, e.g., payment processor systems, workflows, and remote procedure or other function calls, can be supported.

Example Payment Authorization Process

Figure 10:
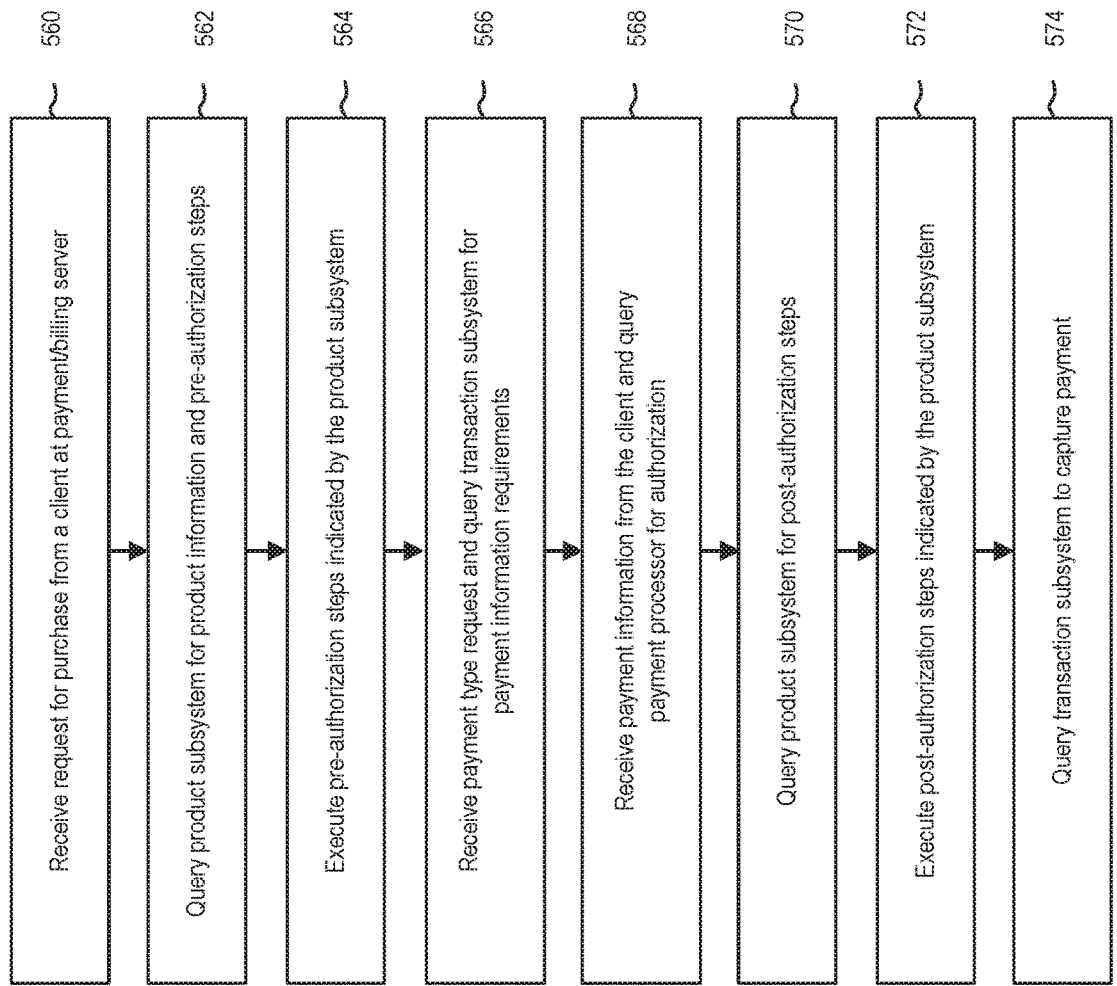
FIG. 10 illustrates an example method used by a payment/billing server to process payments for products, in accordance with an embodiment.

FIG. 10 illustrates an example method used by a payment/billing server to process payments for products, in accordance with an embodiment.

As illustrated in FIG. 10, in accordance with an embodiment, at step 560 a request is received for purchase from a client at a payment/billing server.

At step 562, the product subsystem is queried for product information and pre-authorization steps.

At step 564, pre-authorization steps as indicated by the product subsystem are executed.

At step 566, a payment type request is received and the transaction subsystem is queried for payment information requirements.

At step 568, payment information is received from the client and the payment processor queried for authorization.

At step 570, the product subsystem is queried for post-authorization steps.

At step 572, post-authorization steps indicated by the product subsystem are executed.

At step 574, the transaction subsystem is queried to capture payment.

Figure 11:
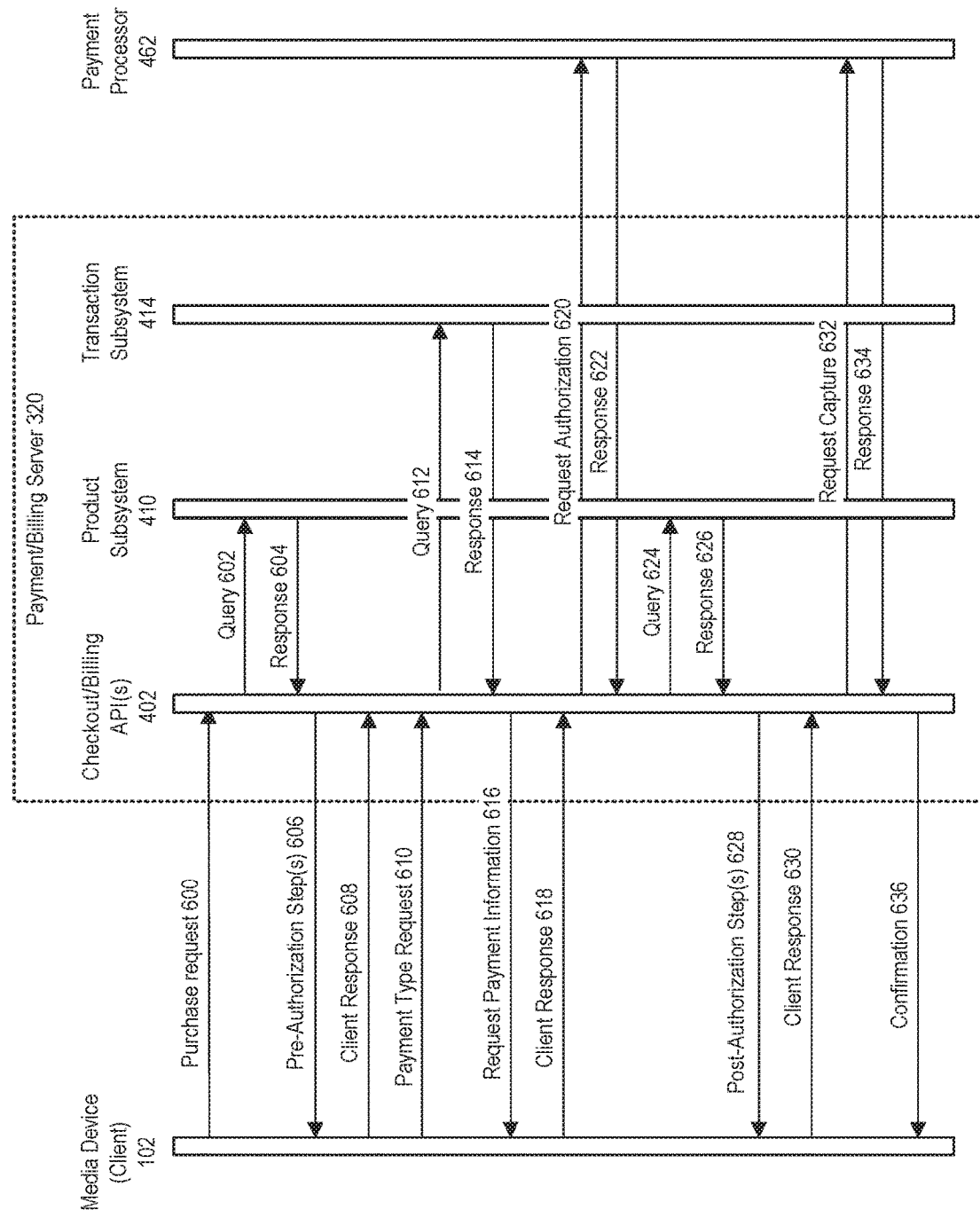
FIG. 11 illustrates a sequence diagram of an example method used by a payment/billing server to process payments for products, in accordance with an embodiment.

FIG. 11 illustrates a sequence diagram of an example method used by a payment/billing server to process payments for products, in accordance with an embodiment.

As illustrated in FIG. 11, in accordance with an embodiment, purchase of a product can be initiated when a payment/billing server receives a request for purchase (600) of the product from a user, e.g., via a client such as a media device.

In accordance with an embodiment, the payment/billing server queries a product subsystem (602) for pre-authorization steps based on the product requested for purchase, and receives a response from the product subsystem (604) that includes the pre-authorization steps and/or product information such as product price. The payment/billing server can then execute the pre-authorization steps (606), which can include sending a request for information from the client, for example, including any verification requirements (e.g., student identification number) or further product-related selection (e.g., seat selection).

In accordance with an embodiment, a response from a client (608) may be automatically generated by the client, for example where the information is stored at a media device for delivery to the payment/billing server, either at the time of purchase request or at any other time prior to authorization. Additionally or alternatively, the response from the client may include information input into the client by a user.

In accordance with an embodiment, prior to, or after the pre-authorization steps are executed, the payment/billing server can request and/or receive a payment type request from the client (610). The payment/billing server can then query the transaction subsystem (612) for requirements for requesting authorization for the purchase, based the payment type. The payment information requirements can include information specific to the location of the user and/or billing address of the user. The transaction subsystem can then respond to the payment/billing server with the payment information requirements (614).

In accordance with an embodiment, if the payment type request is received with the purchase request, the payment/billing server can query both the product subsystem and the transaction subsystem for product information and/or pre-authorization step(s), and payment information requirements, before responding to the client (616), and to then provide appropriate information requests and forms to the client and/or prompt the client to provide appropriate forms to the user to obtain the required payment information (618).

In accordance with an embodiment, the client can optionally pre-populate some or all payment information stored locally at the client or some or all payment information can be pre-populated by the payment/billing server based on payment information stored at the payment/billing server.

In accordance with an embodiment, the payment/billing server, upon receiving the payment information and/or upon receiving confirmation of some or all of the payment information from the client, can then query a payment processor (620) for authorization of the purchase based on the payment details.

In accordance with an embodiment, after receiving a response confirming authorization (622), for example from a payment processor, the payment/billing server can query the product subsystem (624, 626) for post-authorization steps. If there are post-authorization step(s), the payment/billing server requests information from the client (628) required to complete the post-authorization step(s).

In accordance with an embodiment, after receiving the client response (630) with the requested information for completing the post-authorization step(s), the payment/billing server requests capture from the payment processor (632). If the payment processor responds to the payment/billing server (634) that the payment is captured, the payment/billing server responds by sending a confirmation to the client (636), thereby completing the payment processing.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming media service/provider such as Spotify, and streamed music or song content, the systems and techniques described herein can be similarly used with other types of media content environments, and other types of streamed data or media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for orchestration of operations associated with a media content environment, comprising:
a computer including a processor and a server executing thereon that is configured to receive requests from client devices associated with purchases of products associated with a media content environment, which products are useable in combination with a client device to control access and playing by the client device of media content received from a media server;
wherein the server includes:
a plurality of application program interfaces (APIs), including:
a first API that receives communications from the client device directed to the purchases of products, and
a second API that communicates with a payment processor system to process transactions associated with the purchases of products; and
a plurality of subsystem components that are registered with the server and contribute their own steps to a prepare-proceed workflow, including:
a product subsystem that accesses a product database and data stored therein to determine pre-authorization steps required for the purchases of products, and
a transaction subsystem that accesses a transaction database and data stored therein to determine transaction information required for authorization of transactions associated with the purchases of products;
wherein the server includes a data describing the registered subsystems, including the product subsystem and the transaction subsystem;
wherein the server controls the prepare-proceed workflow that orchestrates operations associated with the purchases of the products associated with the media content environment as modified by the steps contributed by the registered subsystems, including, that upon receipt of a request from the client device via a displayed product page, for a transaction associated with purchase of a particular product, the server dynamically generates a workflow to process the transaction, including when the workflow is initiated:
the server queries the registered subsystems, including querying the product subsystem for pre-authorization product-related steps that the particular product requires to be performed prior to advancing to a transaction-related step, by communicating a proceed-product remote procedure call to the product subsystem, for one or more product-related steps associated with the particular product to be inserted into the workflow to cause or otherwise determine corresponding changes in an order state data, and upon generating the workflow, determining and executing, via communication with the client device, the one or more pre-authorization steps associated with the purchase of the particular product including modifying operation of the displayed product page;
the server queries the registered subsystems, including querying the transaction subsystem for transaction-related steps to be inserted into the workflow based on the order state data, by communicating a proceed-payment remote procedure call to the transaction subsystem, for one or more transaction-related steps to be inserted into the workflow based on the order state data; and the server queries the payment processor system to provide authorization of the transaction associated with the purchase of the particular product; and whereupon receipt of the authorization, from the payment processor system, after the transaction-related steps to perform authorization have completed, the server queries the product subsystem for post-authorization product-related steps to insert into the workflow, as a result of the authorization completion, and executes any post-authorization steps, in accordance with the generated workflow, and communicates with the payment processor system to process a capture associated with the transaction.

2. The system of claim 1, wherein each of the plurality of subsystem components is selectively queried by the server according to the generated workflow, and can inject steps associated with that subsystem component, into the generated workflow, during processing of the transaction associated with the product.

3. The system of claim 1, wherein the server maintains the order state data during processing of the transaction associated with the product, for use in creating, adapting or modifying the workflow.

4. The system of claim 1, wherein the plurality of application program interfaces including a checkout application program interface and a billing application program interface that respectively provide communication between the server and a website, and the server and the payment processor system.

5. The system of claim 4, wherein the website enables the purchases of products for use with the media devices in receiving media content from the media content environment.

6. The system of claim 1, wherein the server is adapted to generate different workflows that support a plurality of different payment processor systems.

7. A method for orchestration of operations associated with a media content environment, comprising:

providing, at a computer including a processor, a server executing thereon that is configured to receive requests from client devices associated with purchases of products associated with a media content environment, which products are useable in combination with a client device to control access and playing by the client device of media content received from a media server;

wherein the server includes:

a plurality of application program interfaces (APIs), including:
  a first API that receives communications from the client device directed to the purchases of products, and
  a second API that communicates with a payment processor system to process transactions associated with the purchases of products; and a plurality of subsystem components that are registered with the server and contribute their own steps to a prepare-proceed workflow, including:
  a product subsystem that accesses a product database and data stored therein to determine pre-authorization steps required for the purchases of products, and
  a transaction subsystem that accesses a transaction database and data stored therein to determine trans-action information required for authorization of transactions associated with the purchases of products;

wherein the server includes a data describing the registered subsystems, including the product subsystem and the transaction subsystem;

wherein the server controls the prepare-proceed workflow that orchestrates operations associated with the purchases of the products associated with the media content environment as modified by the steps contributed by registered subsystems, including, upon receipt of a request from the client device via a displayed product page, for a transaction associated with purchase of a particular product, dynamically generating a workflow to process the transaction, including when the workflow is initiated:

querying, by the server, the registered subsystems, including querying the product subsystem for pre-authorization product-related steps that the particular product requires to be performed prior to advancing to a transaction-related step, by communicating a proceed-product remote procedure call to the product subsystem, for one or more product-related steps associated with the particular product to be inserted into the workflow to cause or otherwise determine corresponding changes in an order state data, and upon generating the workflow, determining and executing, via communication with the client device, the one or more pre-authorization steps associated with the purchase of the particular product including modifying operation of the displayed product page;

querying, by the server, the registered subsystems, including querying the transaction subsystem for transaction-related steps to be inserted into the workflow based on the order state data, by communicating a proceed-payment remote procedure call to the transaction subsystem, for one or more transaction-related steps to be inserted into the workflow based on the order state data; and querying the payment processor system to provide authorization of the transaction associated with the purchase of the particular product; and whereupon receipt of the authorization, from the payment processor system, after the transaction-related steps to perform authorization have completed, the server queries the product subsystem for post-authorization product-related steps to insert into the workflow, as a result of the authorization completion, and executes any post-authorization steps, in accordance with the generated workflow, and communicates with the payment processor system to process a capture associated with the transaction.

8. The method of claim 7, wherein each of the plurality of subsystem components is selectively queried by the server according to the generated workflow, and can inject steps associated with that subsystem component, into the generated workflow, during processing of the transaction associated with the product.

9. The method of claim 7, wherein the server maintains the order state data during processing of the transaction associated with the product, for use in creating, adapting or modifying the workflow.

10. The method of claim 7, wherein the plurality of application program interfaces including a checkout application program interface and a billing application program interface that respectively provide communication between the server and a website, and the server and the payment processor system.

11. The method of claim 10, wherein the website enables the purchases of products for use with the media devices in receiving media content from the media content environment.

12. The method of claim 7, wherein the server is adapted to generate different workflows that support a plurality of different payment processor systems.

13. A non-transitory computer readable storage medium, including instructions stored thereon which when read and executed by one or more computers cause the one or more computers to perform a method comprising:

providing, at a computer including a processor, a server executing thereon that is configured to receive requests from client devices associated with purchases of products associated with a media content environment, which products are useable in combination with a client device to control access and playing by the client device of media content received from a media server;

wherein the server includes:

a plurality of application program interfaces (APIs), including:

a first API that receives communications from the device clicnts client device directed to the purchases of products, and a second API that communicates with a payment processor system to process transactions associated with the purchases of products; and a plurality of subsystem components that are registered with the server and contribute their own steps to a prepare-proceed workflow, including:

a product subsystem that accesses a product database and data stored therein to determine pre-authorization steps required for the purchases of products, and a transaction subsystem that accesses a transaction database and data stored therein to determine transaction information required for authorization of transactions associated with the purchases of products;

wherein the server includes a data describing the registered subsystems, including the product subsystem and the transaction subsystem;

wherein the server controls the prepare-proceed workflow that orchestrates operations associated with the purchases of the products associated with the media content environment as modified by the steps contributed by registered subsystems, including, upon receipt of a request from the client device via a displayed product page, for a transaction associated with purchase of a particular product, dynamically generating a workflow to process the transaction, including when the workflow is initiated:

querying, by the server, the registered subsystems, including querying the product subsystem for pre-authorization product-related steps that the particular product requires to be performed prior to advancing to a transaction-related step, by communicating a proceed-product remote procedure call to the product subsystem, for one or more product-related steps associated with the particular product to be inserted into the workflow to cause or otherwise determine corresponding changes in an order state data, and upon generating the workflow, determining and executing, via communication with the client device, the one or more pre-authorization steps associated with the purchase of the particular product including modifying operation of the displayed product page;

querying, by the server, the registered subsystems, including querying the transaction subsystem for transaction-related steps to be inserted into the workflow based on the order state data, by communicating a proceed-payment remote procedure call to the transaction subsystem, for one or more transaction-related steps to be inserted into the workflow based on the order state data; and querying the payment processor system to provide authorization of the transaction associated with the purchase of the particular product; and whereupon receipt of the authorization, from the payment processor system, after the transaction-related steps to perform authorization have completed, the server queries the product subsystem for post-authorization product-related steps to insert into the workflow, as a result of the authorization completion, and executes any post-authorization steps, in accordance with the generated workflow, and communicates with the payment processor system to process a capture associated with the transaction.

14. The non-transitory computer readable storage medium 13, wherein each of the plurality of subsystem components is selectively queried by the server according to the generated workflow, and can inject steps associated with that subsystem component, into the generated workflow, during processing of the transaction associated with the product.

15. The non-transitory computer readable storage medium 13, wherein the server maintains the order state data during processing of the transaction associated with the product, for use in creating, adapting or modifying the workflow.

16. The non-transitory computer readable storage medium 13, wherein the plurality of application program interfaces including a checkout application program interface and a billing application program interface that respectively provide communication between the server and a website, and the server and the payment processor system.

17. The non-transitory computer readable storage medium 16, wherein the website enables the purchases of products for use with the media devices in receiving media content from the media content environment.

* * * * *